Patented Feb. 18, 1930

1,747,661

UNITED STATES PATENT OFFICE

ALVA B. CARTER, OF LINCOLN, NEBRASKA

COATING COMPOSITION

No Drawing. Application filed March 24, 1926. Serial No. 97,121.

This invention relates to a coating composition especially adapted to be used when painting automobiles, machines or similar vehicles and it consists in the novel combination of elements hereinafter described and claimed.

Heretofore, it has been a practice when painting a car in more than one color and by using air brushes to spread grease over that portion of the car which should be protected from the paint. After the paint has been applied the grease is washed off with gasoline or a similar solvent but it has been discovered that the grease causes the paint to fade after a short period of time.

It has also been a practice to paste paper over a painted portion of the car while painting another portion. This requires considerable time and labor. In a vast number of incidents the paper is difficult to remove because of the fact that it has become waterproof as a result of the paint splashing upon it. Hence, to remove the paper it is necessary to pull the same off and in many instances the painted surface comes off with the paper and the job is spoiled.

In still other instances, compositions have been used to protect the painted parts but these compositions have been found to exert great affinity for water or moisture and in rainy or damp weather the moisture accumulates upon the composition and runs down in the work to areas where not intended producing stains and therefore making this method undesirable for use under such disadvantageous climatic conditions.

The object of the present invention is to provide a coating composition in the use of which the above mentioned difficulties will be overcome and eliminated. The coating composition possesses a creamy color and is being introduced as "speed cream."

The coating composition consists of the following ingredients compounded approximately in the proportions stated, namely, 7.692% pigment coloring, 15.384% wheat flour, 30.758% whiting (chalk), 46.152% low temperature glycerine.

In compounding, the pigment coloring, whiting and flour are mixed thoroughly and the glycerine is added slowly, by stirring constantly and the mass is allowed to set over night before using.

The whiting (chalk) is used as a body because of its chemical purity and low cost. Glycerine is used because of its viscosity and because it will not dry or harden. Flour is used to hold the whiting in suspension. The coloring pigment is used so that the coating when applied will be more visible on the surface of the car.

The composition when applied dries to the consistency of heavy honey, but will not dry more, thus making it possible to spread the composition heavily without danger of its running down the surface to which it is applied. The composition will not spot or stain lacquer. It will not crack or check when covered with lacquer, thus making it possible to put more than one coat over with safety. The composition is soluble in water and can be washed off easily and quickly. The composition is not affected by damp weather. The composition spreads easily and even brush marks flow together and leave a clean-cut edge. Striping with lacquer is possible. The composition if sealed will keep indefinitely and can be manufactured at a low cost.

The following will illustrate the mode of applying and using this composition. Assuming that it is desired to paint a car with a cream body, a brown super-structure and black fenders, the old paint is first removed from the car and this composition is then applied to the window glass, top cloth and fenders. The body and super-structure are then given filling coats and sanding coats. After these coats are prepared for color the body is then coated with the composition. The super-structure is then sprayed with the brown paint or color desired and as many coats are applied as may be necessary to constitute the job. The composition is then removed from the body and some of the composition is put on the super-structure, or brown paint. The body of the car is then sprayed with cream color or whatever color may be desired. The composition is then removed from the super-structure and fenders and some of the same placed on the body and lines around the fenders so that said fenders and splash pans may be sprayed with black color. This procedure is followed throughout the entire painting job.

This composition coating not only protects lacquer but it also protects the finest kinds of varnish and polished surfaces without danger of disfiguring the finish in any way regardless of the length of time that the composition is permitted to remain on such protected surfaces.

From the foregoing description it will be seen that I have provided a simple, inexpensive and efficient means for carrying out the objects of the invention.

Having thus described my invention, what I claim is:

1. A coating composition comprising pigment coloring approximately 7 per cent plus, wheat flour approximately 15 per cent plus, whiting approximately 30 per cent plus and glycerine approximately 46 per cent plus.

2. A masking composition for protecting a portion of a surface area which is to remain uncoated upon the application of a coating composition to the remaining surface, which comprises a major portion of a mixture of glycerine and whiting, together with a minor portion of another inert filler.

In testimony whereof I affix my signature.

ALVA B. CARTER.